3,274,210
NEW SILICON-CONTAINING ISOXAZOLES AND ISOXAZOLINES

Christian Henri Yves Fritsch and Marcel Joseph Celestin Lefort, Lyon, France, assignors to Rhone-Poulenc S.A., Paris, France, a French body corporate
No Drawing. Filed July 20, 1964, Ser. No. 383,928
Claims priority, application France, July 24, 1963, 942,515; Nov. 8, 1963, 953,193
16 Claims. (Cl. 260—307)

This invention relates to organo-silicon compounds.

The invention provides isoxazoles and isoxazolines substituted in the 5-position, or in both the 4- and 5-positions, by a silicon-containing radical. These compounds have the formula:

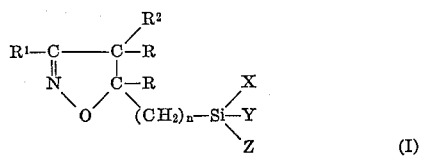

(I)

in which the R substituents either represent hydrogen atoms or together represent a single bond, $R^1$ is a hydrocarbon radical, preferably alkyl or aryl, either unsubstituted or substituted by a nitro radical or a radical of formula:

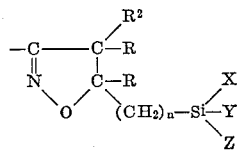

$R^2$ is hydrogen or a radical of formula:

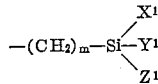

$n$ and $m$ are each zero or an integer, preferably 1, and X, Y, Z, $X^1$, $Y^1$ and $Z^1$ are the same or different and represent halogen, hydroxyl, saturated or unsaturated hydrocarbon, hydrocarbonoxy or acyloxy radicals, and X and $X^1$ may also be a siloxane or polysiloxane chain terminated by a radical of formula:

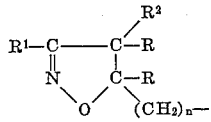

In the compounds of Formula I, $R^1$ is ordinarily an unsubstituted hydrocarbon radical, preferably phenyl or lower alkyl, but $R^1$ may also advantageously be nitro (lower alkyl) or a radical of formula:

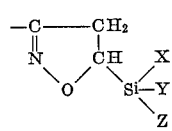

in which X, Y and Z are each lower alkyl. (Where a radical is stated herein to be "lower" it means that the radical in question contains not more than four carbon atoms.)

$R^2$ is preferably hydrogen or alternatively a radical of formula:

in which X, Y and Z are each lower alkyl.

The preferred values of X, Y and Z are lower alkyl, lower alkoxy, lower alkanoyloxy, or chloro and X may also be vinyl, allyl, or vinyl-di(lower alkyl)siloxy.

In particular, the two following classes of compounds within the scope of Formula I have been found to be especially valuable: (1) the compounds of the formula:

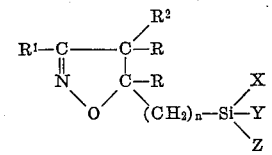

in which the R substituents either represent hydrogen atoms or together represent a single bond $R^1$ is phenyl or lower alkyl, $R^2$ is hydrogen or tri(lower alkyl)silyl, $n$ is 0 or 1, and X, Y, and Z are each lower alkyl, lower alkoxy, lower alkanoyloxy, or chloro, and when $R^2$ is hydrogen, X may be a radical of formula:

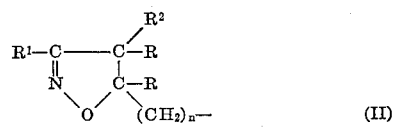

(II)

and (2) the compounds of the formula:

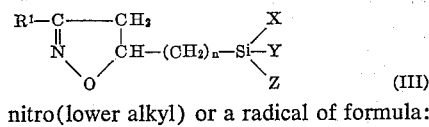

(III)

in which $R^1$ is nitro(lower alkyl) or a radical of formula:

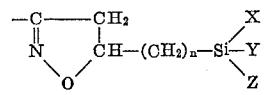

$n$ is 0 or 1, Y and Z are lower alkyl and X is lower alkyl, vinyl, allyl, vinyl-di(lower alkyl)siloxy.

In accordance with a feature of the invention the compounds of Formula I are prepared by reacting a nitrile oxide of the formula:

$$r^1\!-\!C\!\equiv\!NO \qquad (IV)$$

in which $r^1$ is the same as $R^1$ or is a hydrocarbon radical substituted by a nitrile oxide radical, with an unsaturated compound of the formula:

(V)

in which $r^2$ is the same as $R^2$ or a radical of formula:

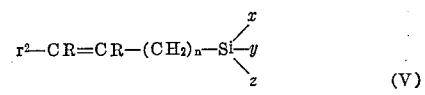

and x, y, z, $x^1$, $y^1$ and $z^1$ are the same as X, Y, Z, $X^1$, $Y^1$ and $Z^1$ respectively and x and $x^1$ may also be a siloxane or polysiloxane chain terminated by a radical of formula:

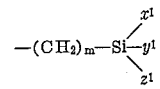

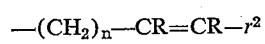

The nitrile oxide of Formula IV, whether a mononitrile monoxide or a dinitrile monoxide or dioxide, is advantageously produced by the action of a dehydrating agent such as an organic isocyanate on a corresponding nitrocompound containing the group —$CH_2NO_2$, or by the action of a dehydrochlorination reagent, such as a tertiary amine, on a corresponding chloroxime containing the group —$CCl=NOH$. It is generally unnecessary to isolate the nitrile oxide formed, so that these reactions may be used for the production of the nitrile oxides in situ.

The unsaturated silicon-containing compounds of Formula V are known. The are, for example, vinyl silanes, allyl silanes, vinyl polysiloxanes or allyl polysiloxanes.

Unsaturated silicon-containing isoxazolines of Formula I are capable of reacting with other molecules of a nitrile oxide via their double bond, and when they also contain a nitromethyl group —$CH_2NO_2$, they may be converted into a nitrile oxide and again combined with another molecule of a silicon compound having two ethylenic bonds. It is thus possible to obtain polycondensates of relatively high molecular weight in step-wise fashion.

The new silicon-containing isoxazoles and isoxazolines of the invention are useful as intermediates in organic syntheses. For example, on hydrogenolysis, they give the aliphatic aminoalcohols of formula:

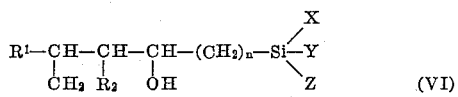

(VI)

Moreover, compounds of Formula I carrying hydrolysable radicals on the silicon atoms may be used in making organo-silicic polymers.

The following examples illustrate the invention.

Example 1

Into a three-necked, one-litre, round-bottomed flask provided with a stirrer, reflux condenser and a dropping funnel are introduced 35 g. of phenylchloromethanaloxime (obtained by the procedure of C. W. Perold et al., J. Amer. Chem. Soc., 79, 462 (1957)) in 100 cc. of ether. The mixture is cooled to —5° C. and 110 cc. of a 14%-by-weight sodium hydroxide solution is slowly run-in, any temperature rise being avoided, and the product is then stirred for a further 15 minutes at this temperature. The ethereal phase is separated, washed with water and dried over calcium chloride and then over phosphorus pentoxide, the temperature still being maintained below 0° C. There is thus obtained an ethereal solution of benzonitrile oxide.

This benzonitrile oxide solution, kept at 0° C. and filtered, is introduced into a one-litre three-necked round-bottomed flask provided with a stirrer and a dropping funnel, and a solution of 19 g. of triethylvinylsilane in 50 cc. of diethyl ether is then run-in in 40 minutes, the temperature of the reaction mixture being maintained at about —5° C. The product is stirred for a further hour at this temperature and then allowed to stand for 24 hours at ambient temperature. The ether is driven off and the product is distilled. There are thus obtained 17 g. of 3 - phenyl - 5 - triethylsilyl - isoxazoline, B.P./0.05 mm. Hg=136–137° C.; $d_4^{20}$=1.021; $n_D^{20}$=1.5400, in a yield of 50% based on the vinyltriethylsilane.

Example 2

By replacing the triethylvinylsilane of Example 1 by 22.5 g. of methyldiethoxyvinylsilane, there are obtained 20 g. of 3 - phenyl - 5 - methyldiethoxysilyl - isoxazoline, B.P./0.2 mm. Hg=128–130° C.; $n_D^{20}$=1.5168;

$$d_4^{20}=1.081$$

in a yield of 50% based on the methylvinyldiethoxysilane.

Example 3

By replacing the vinyltriethylsilane of Example 1 by 38 g. of triethoxyvinylsilane, there are obtained 37 g. of 3-phenyl-5-triethoxysilyl-isoxazoline, B.P./0.3 Hg=149° C.; $n_D^{20}$=1.500; $d_4^{20}$=1.085; in a yield of 60% based on the vinyltriethoxysilane.

Example 4

By replacing the vinyltriethylsilane of Example 1 by 42 g. of methylvinyldichlorosilane, there are obtained 20.5 g. of 3 - phenyl - 5 - methyldichlorosilyl - isoxazoline, B.P./0.03 mm. Hg=120° C., in a yield of 62% based on the reacted methylvinyldichlorosilane.

Example 5

By replacing the vinyltriethylsilane of Example 1 by 65 g. of vinyltrichlorosilane, there are obtained 44 g. of 3-phenyl-5-trichlorosilyl-isoxazoline, B.P./0.1 Hg=130° C., in a yield of 50% based on the reacted vinyltrichlorosilane.

Example 6

By replacing the vinyltriethylsilane of Example 1 by 12 g. of 1,3-divinyltetramethyldisiloxane, there are obtained 14 g. of 1,3-bis-(3'-phenyl - 5' - isoxazolinyl)tetramethyldisiloxane:

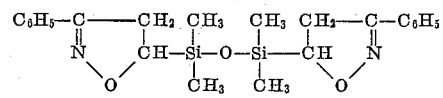

B.P./1.5 mm. Hg=159–160° C.; $n_D^{20}$=1.5155;

$$d_4^{20}=1.044$$

in a yield of 55% based on the 1,3-divinyltetramethyldisiloxane.

Example 7

By replacing the vinyltriethylsilane of Example 1 by 23 g. of allyltrimethylsilane, there are obtained 20 g. of a pale yellow solid which, after recrystallisation from a mixture of diethyl ether and petroleum ether, gives 15 g. of 3-phenyl-5-trimethylsilylmethyl-isoxazoline, M.P. 46° C., in a yield of 40% based on the allyltrimethylsilane.

Example 8

Into a 250-cc. three-necked round-bottomed flask provided with a stirrer, a reflux condenser, a dropping funnel and a thermometer tube are introduced: 15 g. of nitroethane; 35.5 g. of vinyltriethylsilane; 48 g. of phenyl isocyanate; and 50 cc. of anhydrous benzene.

A solution of 0.5 cc. of triethylamine in 25 cc. of anhydrous benzene is run-in in 20 minutes. A precipitate forms and the temperature rises slowly and spontaneously to 71° C. At the end of the running-in, the mixture is heated under reflux for 2½ hours and then allowed to cool. It is filtered and the precipitate is washed with anhydrous benzene. The precipitate consists of 40 g. of diphenylurea having a melting point equal to 246° C., and the filtrate gives, on distillation, 15 g. of unreacted vinyltriethylsilane and 13 g. of 3-methyl-5-triethylsilyl-isoxazoline, B.P./0.85 mm. Hg=89° C.; $n_D^{20}$=1.4673; $d_4^{20}$=0.922, in a yield of 50% based on the reacted vinyltriethylsilane.

Example 9

The procedure of Example 8 is followed, replacing the vinyltriethylsilane by 42 g. of methylvinyldiacetoxysilane. There are obtained 24 g. of 3-methyl-5-methyldiacetoxysilyl-isoxazoline, B.P./0.04 mm. Hg=100° C.;

$$n_D^{20}=1.4492$$

in a yield of 50% based on the methylvinyldiacetoxysilane.

Example 10

The procedure of Example 8 is followed, the vinyltriethylsilane being replaced by 45.6 g. of allyltrimethylsilane. 27 g. of 3-methyl-5-trimethylsilylmethyl-isoxazoline are obtained, B.P./30 mm. Hg=122–123° C.;

$$n_D^{20}=1.4580$$

$d_4^{20}$=0.924, in a yield of 78% based on the allyltrimethylsilane.

Example 11

The procedure of Example 8 is followed, the vinyltriethylsilane being replaced by 50 g. of 1,2-bis-(trimethylsilyl)acetylene. 18 g. of 3 - methyl - 4,5-bis-(trimethylsilyl)-isoxazole are obtained, B.P./0.03 mm. Hg=65° C.; $n_D^{20}$=1.4768; $d_4^{20}$=0.9423, in a yield of 32% based on the 1,2-bis-(trimethylsilyl)acetylene.

Example 12

Into a 500-cc. three-necked, round-bottomed flask provided with a stirrer, a dropping funnel and a condenser, the whole communicating with the atmosphere through a calcium chloride tube, are introduced: 45 g. of 1,4-dinitrobutane; 56 g. of diallyldimethylsilane; 53 g. of diisocyanatotoluene (a mixture of the isomers); and 180 cc. of anhydrous benzene.

4 cc. of a solution of 0.5 cc. of triethylamine in 20 cc. of anhydrous benzene are run-in in 15 minutes, the reaction mass being maintained at about 20° C. The mixture is then heated under reflux for 2 hours. The precipitated polyurea (formed by reaction of the mixture of diisocyanatotoluenes with the water emanating from the dehydration of 1,4-dinitrobutane) is filtered off and washed with anhydrous benzene. The benzene is distilled from the filtrate, and the residue is distilled in vacuo. There are thus obtained 15 g. of 3-(3'-nitropropyl)-5-allyldimethylsilylmethyl-isoxazoline, B.P./0.5 mm. Hg=202° C.; $n_D^{20}=1.4929$; $d_4^{20}=1.0605$. The yield is 28% based on the 1,4-dinitrobutane (prepared as described by H. Feuer and G. Leston, Organic Syntheses, 34, 37–39 (1954)).

Example 13

The procedure of Example 12 is followed, the dimethyldiallylsilane being replaced by 40 g. of 1,1,3,3-tetramethyl-1,3-divinyldisiloxane. There are thus obtained 14 g. of 1-[3'-(3''-nitropropyl) - 5 - isoxazolinyl]-3-vinyl-1,1,3,3-tetramethyldisiloxane, B.P./0.35 mm. Hg=148° C.; $n_D^{20}=1.4583$; $d_4^{20}=1.030$, in a yield of 44% based on the 1,4-dinitrobutane.

Example 14

Into a one-litre, three-necked, round-bottomed flask provided with a stirrer and a dropping funnel are introduced: 80 g. of 1,1,3,3-tetramethyl-1,3-divinyldisiloxane; 50 g. of triethylamine; and 300 cc. of diethyl ether. The temperature of the reaction mixture is lowered to −5° C., and 300 cc. of a solution in diethyl ether of 32 g. of dichloroglyoxime are run into it in 2 hours, the temperature being maintained at about −5° C.

After the addition, the temperature is allowed to rise to ambient temperature, and the triethylamine hydrochloride is filtered off and washed with diethyl ether. The ether is distilled from the filtrate, and the residue is distilled in vacuo. There are thus obtained 32 g. of bis[5-(3'-vinyl - 1',1',3',3' - tetramethyl-1'-disiloxy)-3-isoxazolinyl]:

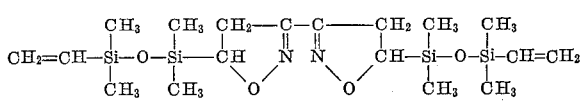

It has B.P./0.07 mm. Hg=145° C.; $n_D^{20}=1.4620$; $d_4^{20}=1.002$.

Example 15

This is an example of the use of the compounds of the invention.

Into a 250-cc. three-necked round-bottomed flask provided with a stirrer, a reflux condenser and a dropping funnel are introduced 250 cc. of diethyl ether and 12 g. of lithium-aluminium hydride.

There are thereafter run-in in 45 minutes 20 g. of 3-methyl-5-trimethylsilylmethylisoxazoline, prepared as in Example 10, and the mixture is then heated under reflux for 18 hours. The excess of lithium-aluminium hydride is hydrolysed, and the ethereal solution is separated and dried over sodium sulphate. The ether is driven off and the product is distilled. There are obtained 12 g. of 1 - trimethylsilyl - 4 - amino - 2-pentanol, B.P./0.05 mm. Hg=31° C.; $n_D^{20}=1.4540$; $d_4^{20}=0.882$, the hydrochloride of which melts at 170° C. The yield is 60% based on the 3-methyl-5-trimethylsilylmethylisoxazoline.

We claim:
1. A compound of the formula:

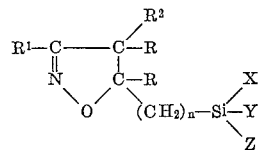

in which the R substituents when taken separately represent hydrogen atoms and when taken together represent a single bond, $R^1$ is a member selected from the class consisting of phenyl and lower alkyl, $R^2$ is a member selected from the class consisting of hydrogen and tri (lower alkyl) silyl, n is an integer at least 0 and at most 1, and X, Y, and Z are each members selected from the class consisting of lower alkyl, lower alkoxy, lower alkanoyloxy, and chloro, and when $R^2$ is hydrogen, in the case of X, a radical of formula:

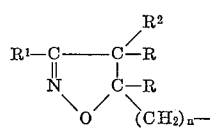

2. A a compound of the formula:

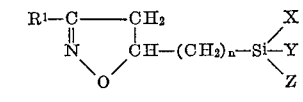

in which $R^1$ is a member selected from the class consisting of nitro(lower alkyl) and a radical of formula:

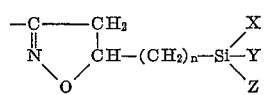

n is an integer at least 0 and at most 1, Y and Z are lower alkyl and X is a member selected from the class consisting of lower alkyl, vinyl, allyl, and vinyl-di(lower alkyl) siloxy.

3. 3-phenyl-5-triethylsilyl-isoxazoline.
4. 3-phenyl-5-methyldiethoxysilyl-isoxazoline.
5. 3-phenyl-5-triethoxysilyl-isoxazoline.
6. 3-phenyl-5-methyldichlorosilyl-isoxazoline.
7. 3-phenyl-5-trichlorosilyl-isoxazoline.
8. 1,3 - bis - (3 - phenyl - 5-isoxazolinyl)tetramethyldisiloxane.
9. 3-phenyl-5-trimethylsilylmethyl-isoxazoline.
10. 3-methyl-5-triethylsilyl-isoxazoline.
11. 3-methyl-5-methyldiacetoxysilyl-isoxazoline.
12. 3-methyl-5-trimethylsilylmethyl-isoxazoline.
13. 3-methyl-4,5-bis(trimethylsilyl)-isoxazole.
14. 3 - (3' - nitropropyl) - 5 - allyldimethylsilylmethyl-isoxazoline.
15. 1-[3'(3''-nitropropyl) - 5' - isoxazolinyl] - 3-vinyl-1,1,3,3-tetramethyldisiloxane.
16. Bis[5-(3'-vinyl-1',1',3',3'-tetramethyl - 1'-disiloxy)-3-isoxazolinyl].

No references cited.

ALEX MAZEL, *Primary Examiner.*

HENRY R. JILES, *Examiner.*

RICHARD J. GALLAGHER, *Assistant Examiner.*